(12) United States Patent
Tashima et al.

(10) Patent No.: US 7,987,043 B2
(45) Date of Patent: Jul. 26, 2011

(54) FUEL INJECTION CONTROL APPARATUS FOR INTERNAL COMBUSTION ENGINE

(75) Inventors: Kazuchika Tashima, Toyota (JP); Tomohiro Fujita, Toyota (JP); Akihiro Hanai, Toukai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 68 days.

(21) Appl. No.: 12/544,653

(22) Filed: Aug. 20, 2009

(65) Prior Publication Data

US 2010/0049424 A1 Feb. 25, 2010

(30) Foreign Application Priority Data

Aug. 21, 2008 (JP) ................................ 2008-212932

(51) Int. Cl.
*B60T 7/12* (2006.01)
(52) U.S. Cl. .................... 701/113; 701/103; 123/434
(58) Field of Classification Search .......... 701/103–105, 701/113; 123/434, 436, 673, 681, 687
See application file for complete search history.

(56) References Cited

U.S. PATENT DOCUMENTS

| | | | | |
|---|---|---|---|---|
| 6,062,189 A | * | 5/2000 | Kaneko et al. | 123/295 |
| 7,255,089 B2 | * | 8/2007 | Etou et al. | 123/406.29 |
| 7,421,999 B2 | * | 9/2008 | Kim et al. | 123/295 |
| 7,493,890 B2 | * | 2/2009 | Etou et al. | 123/406.29 |
| 7,624,709 B2 | * | 12/2009 | Cao | 123/64 |
| 2009/0093950 A1 | * | 4/2009 | Yi et al. | 701/105 |

FOREIGN PATENT DOCUMENTS

| | | |
|---|---|---|
| JP | 1-249933 | 10/1989 |
| JP | 3-47435 | 2/1991 |
| JP | 7-158482 | 6/1995 |
| JP | 8-210163 | 8/1996 |
| JP | 2003-56382 | 2/2003 |
| JP | 2007-211659 | 8/2007 |
| JP | 2008-8301 | 1/2008 |

\* cited by examiner

*Primary Examiner* — John T Kwon
(74) *Attorney, Agent, or Firm* — Oblon, Spivak, McClelland, Maier & Neustadt, L.L.P.

(57) ABSTRACT

A fuel injection control apparatus for an internal combustion engine injects fuel from a fuel injection valve in each cylinder in a fuel injection mode in which an amount of fuel in the combustion chamber corresponds to a required value for starting the internal combustion engine when fuel in the combustion chamber is combusted in each cylinder after a crankshaft angle is determined through cranking for starting the internal combustion engine. When the fuel has a high alcohol concentration and is combusted after the determination of the crankshaft angle, the control apparatus sets the fuel injection mode for fuel with a high alcohol concentration as the fuel injection mode in which the amount of fuel in the combustion chamber corresponds to the required value for starting the internal combustion engine.

8 Claims, 9 Drawing Sheets

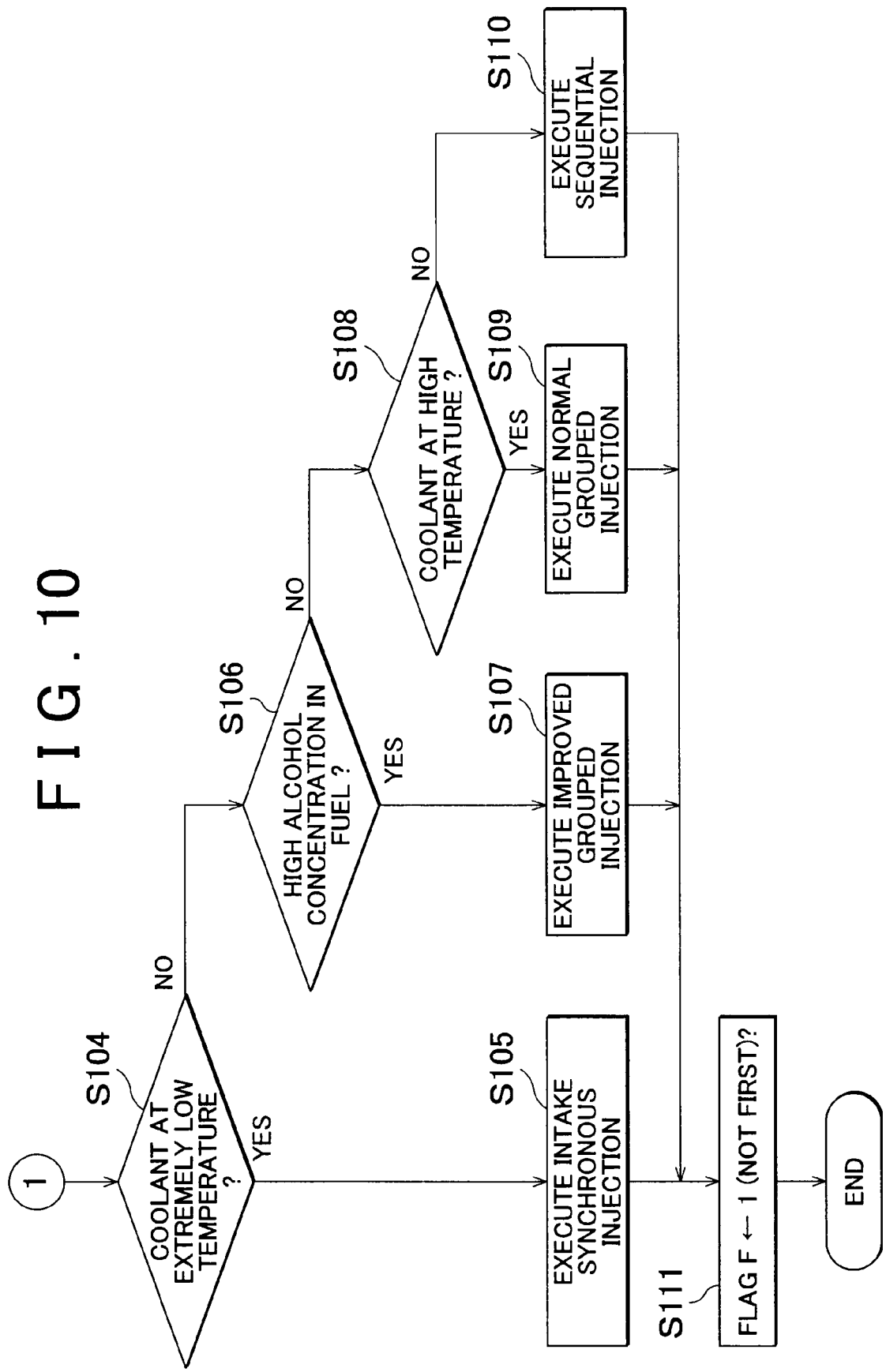

FUEL INJECTION CONTROL APPARATUS FOR INTERNAL COMBUSTION ENGINE

INCORPORATION BY REFERENCE

The disclosure of Japanese Patent Application No. 2008-212932 filed on Aug. 21, 2008 including the specification, drawings and abstract is incorporated herein by reference in its entirety.

BACKGROUND OF THE INVENTION

1. Field of the Invention

The present invention relates to a fuel injection control apparatus for an internal combustion engine.

2. Description of the Related Art

Multi-cylinder internal combustion engines, such as automobile engines, in which a fuel injection valve that injects fuel (gasoline) from an intake passage to a combustion chamber is provided in each cylinder have been put to practical use. When a fuel-injected engine is started, a required fuel injection amount for starting up the engine is computed as a start-up injection amount command value. Then, after the crankshaft angle is determined through cranking for starting the engine, amount of fuel corresponding to the start-up injection amount command value is injected from the intake passage to the combustion chamber through drive control of the fuel injection valve for each cylinder.

The cylinders in the above multi-cylinder internal combustion engine are grouped into a forward-stroke cylinder group and a return-stroke cylinder group. The forward-stroke cylinder group is a group of cylinders in which the amount of fuel corresponding to the start-up injection amount command value may be injected by an early period of first intake valve opening after the crankshaft angle is determined. Meanwhile, the return-stroke cylinder group is a group of cylinders in which the amount of fuel corresponding to the start-up injection amount command value cannot be injected by the early period of first intake valve opening after the crankshaft angle is determined.

As a fuel injection mode for injecting the amount of fuel corresponding to the start-up injection amount command value after the crankshaft angle is determined, a fuel injection mode in which the fuel amount corresponding to a required value for starting the engine when the fuel in the combustion chamber is combusted may be employed. And such fuel injection modes include sequential injection and grouped injection that are described in Japanese Patent Application Publication No. 7-158482 (JP-A-7-158482) (paragraphs [0004], [0005], [0019], and [0030]), for example.

Sequential injection is a fuel injection mode in which the amount of fuel corresponding to the start-up injection amount command value is injected into each cylinder in an early period of the first intake valve opening in order to reduce the exhaust emissions of the internal combustion engine. The reason exhaust emissions may be reduced by injecting an amount of fuel corresponding to the start-up injection amount command value in the early period of the first intake valve opening is because the time is required for the fuel to enter the combustion chamber after being injected, and thus the vaporized fuel tends to enter the combustion chamber, which suppresses entry and combustion of liquid fuel in the combustion chamber. If liquid fuel is combusted in the combustion chamber, the amount of hydrocarbon (HC) and smoke (soot) in exhaust emissions are increased. Such increase in exhaust pollutants may be suppressed through the sequential injection.

The grouped injection is a fuel injection mode in which the cylinders at the same position of a piston in the forward-stroke cylinder group and the return-stroke cylinder group are grouped, and the amount of fuel corresponding to the start-up injection amount command value is injected at the same start timing for the same injection period in the cylinders of the same group. Considering the startability of the internal combustion engine, it is conceivable for the grouped injection that the injection of the amount of fuel corresponding to the start-up injection amount command value may be completed by the early period of the first intake valve opening in each cylinder in the forward-stroke cylinder group. If the injection of the fuel amount corresponding to the start-up injection amount command value continues after the early period of the first intake valve opening, the fuel will not be efficiently supplied. It is because the supply of fuel into the combustion chamber is interfered with either by a closing movement of the intake valve from a fully open state in a late period of the intake valve opening or by the closed intake valve. Because of the inefficient fuel supply as described above, the startability of the internal combustion engine may deteriorate. However, such deterioration in startability is prevented by the above setting of the fuel injection start timing in the grouped injection.

When mixed fuel of gasoline and alcohol is used as fuel for the internal combustion engine, and when the above sequential injection or the grouped injection is adopted as the fuel injection mode for the injection of fuel amount corresponding to the start-up injection amount command value after the determination of the crankshaft angle, the fuel with a high alcohol concentration may deteriorate the startability of the internal combustion engine. This is related to a decrease in volatility of the mixed fuel with an increase in an alcohol concentration in the fuel in comparison with gasoline fuel. In other words, if either the sequential injection or the grouped injection, which are the fuel injection modes set for use of gasoline fuel, is executed after the determination of the crankshaft angle without consideration of such volatility characteristics of the mixed fuel, the amount of fuel to be combusted in the combustion chamber after the determination of the crankshaft angle becomes insufficient. As a result, the fuel is not favorably combusted in the combustion chamber, and thus the startability of the internal combustion engine may deteriorate.

SUMMARY OF THE INVENTION

The present invention provides a fuel injection control apparatus for an internal combustion engine that allows fuel with a high alcohol concentration to be combusted favorably in a combustion chamber after determination of a crankshaft angle and that can also avoid deterioration in startability of the internal combustion engine that is caused by insufficient fuel combustion.

A first aspect of the present invention relates to the fuel injection control apparatus for the internal combustion engine. The internal combustion engine includes a fuel injection valve that injects fuel from an intake passage to a combustion chamber in each cylinder. The control apparatus includes a control section (control means). The control section controls the fuel injection valve in each cylinder to inject fuel in a fuel injection mode in which an amount of fuel in the combustion chamber corresponds to a required value for starting the internal combustion engine when the fuel in the combustion chamber is to be combusted in each cylinder after a crankshaft angle is determined through cranking for starting the internal combustion engine. The control section sets a fuel injection mode for fuel with a high alcohol concentration as the fuel injection mode in which the amount of fuel in the combustion chamber corresponds to the required value for starting the internal combustion engine when fuel has an alcohol concentration higher than a predetermined concentration and is to be combusted in the combustion chamber in each cylinder after determination of the crankshaft angle.

A second aspect of the present invention relates to a fuel injection control method for an internal combustion engine. The internal combustion engine includes a fuel injection valve that injects fuel from an intake passage to a combustion chamber in each cylinder. The control method includes: controlling the fuel injection valve in each cylinder to inject fuel in a fuel injection mode in which an amount of fuel in the combustion chamber corresponds to a required value for starting the internal combustion engine when the fuel in the combustion chamber is to be combusted in each cylinder after a crankshaft angle is determined through cranking for starting the internal combustion engine; and setting a fuel injection mode for fuel with a high alcohol concentration as the fuel injection mode in which the amount of fuel in the combustion chamber corresponds to the required value for starting the internal combustion engine when fuel has an alcohol concentration higher than a predetermined concentration and is to be combusted in the combustion chamber in each cylinder after determination of the crankshaft angle.

A third aspect of the present invention relates to the fuel injection control apparatus for the internal combustion engine. The internal combustion engine includes a fuel injection valve that injects fuel from an intake passage to a combustion chamber in each cylinder. The control apparatus includes: a determining portion (determining means) hat determines a crankshaft angle by cranking for starting the internal combustion engine; an adjusting portion (adjusting means) that adjusts an amount of the fuel in the combustion chamber when the fuel in the combustion chamber is combusted in each cylinder; and an injecting portion (injecting means) that injects the adjusted amount of the fuel adjusted by the adjusting portion to the combustion chamber is combusted in each cylinder, after the crankshaft angle is determined. The adjusting portion adjusts the amount of the fuel in the combustion chamber based on a concentration of alcohol in the fuel.

According to the above configuration, in the case where the fuel has a high alcohol concentration, the fuel injection mode is shifted to the fuel injection mode for fuel with a high alcohol concentration that can correspond to the case. Then, the fuel is injected from the fuel injection valve in each cylinder after the crankshaft angle is determined in order to execute the fuel injection mode for fuel with a high alcohol concentration. The fuel injection mode for fuel with a high alcohol concentration is set as a fuel injection mode in which the fuel amount in the combustion chamber corresponds to the required value for starting the engine when the fuel has a high concentration of alcohol and is combusted in the combustion chamber of each cylinder after the determination of the crankshaft angle. Therefore, when the fuel in the combustion chamber is combusted after the determination of the crankshaft angle, it is possible to prevent insufficient fuel combustion in the combustion chamber that is caused by a decrease in volatility of the fuel with a high alcohol concentration. Consequently, it is possible to avoid deterioration in startability of the internal combustion engine that is caused by poor fuel combustion associated with insufficient fuel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10 is a flowchart that shows the switching procedure of the fuel injection mode after starting the engine and the determination of the crankshaft angle, and that also shows the procedure to execute the fuel injection mode.

DETAILED DESCRIPTION OF AN EMBODIMENT

An embodiment of a fuel injection control apparatus for an automobile V8 engine, in which a blended fuel of gasoline and alcohol is used, will be described with reference to FIG. 1 to FIG. 10.

Figure 1:
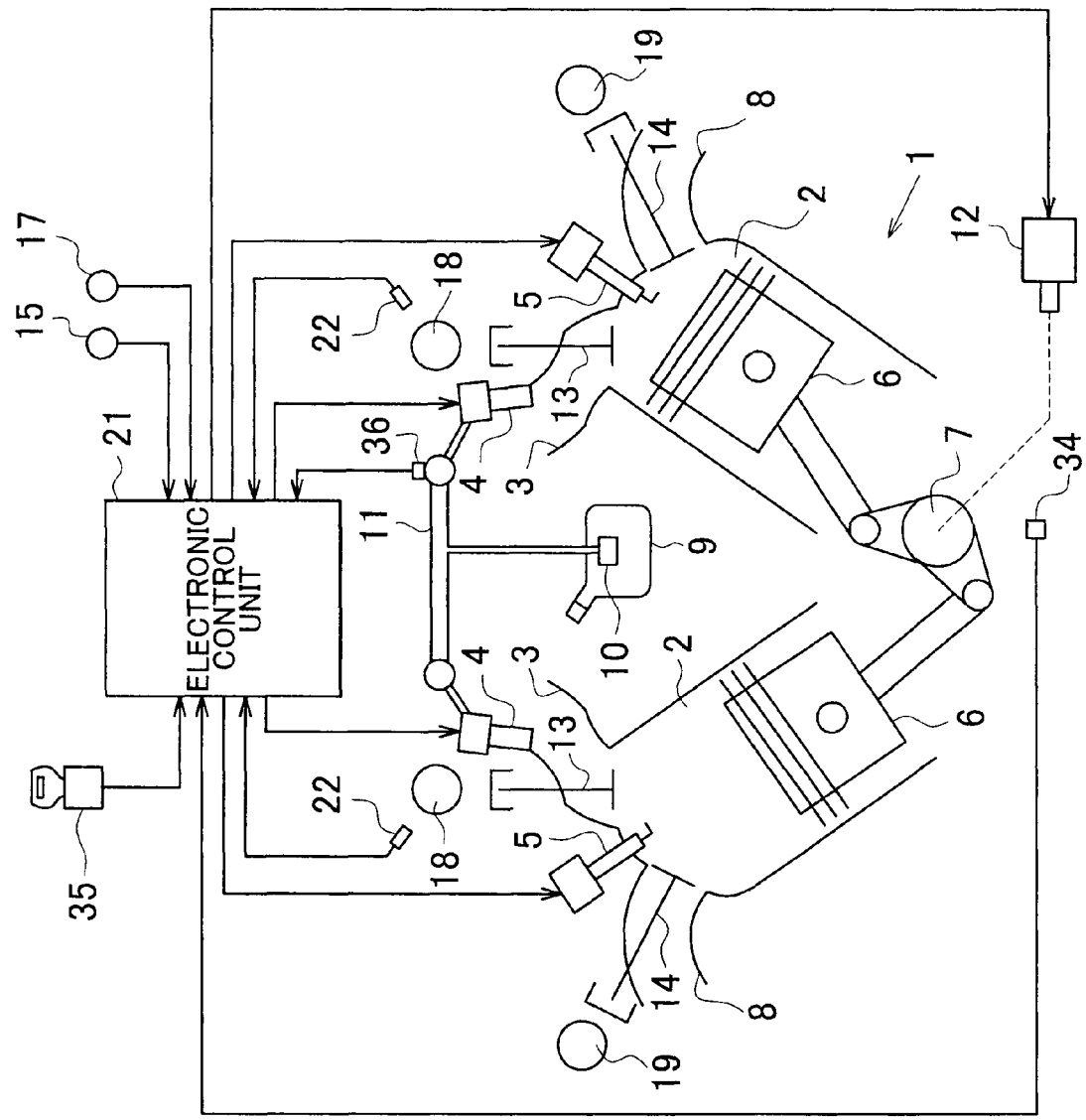
FIG. 1 is a schematic view of an entire engine equipped with a fuel injection control apparatus of the example embodiment.

In the engine 1 shown in FIG. 1, air is directed to a combustion chamber 2 from an intake passage 3 that is communicated with the combustion chamber 2 of each cylinder. Fuel is injected at inside of the intake passage 3 toward the combustion chamber 2 by a fuel injection valve 4 that is provided in each cylinder. Then, air-fuel mixture is supplied to the combustion chamber 2. The fuel injection valve 4 is connected to a delivery pipe 11 to which fuel stored in a fuel tank 9 is supplied through drive of a fuel pump 10.

As described above, when air and fuel is guided to the combustion chamber 2 of each cylinder in the engine 1, the air-fuel mixture is formed in the combustion chamber 2 and is ignited by an ignition plug 5. When the air-fuel mixture is ignited as described above, the air-fuel mixture is combusted and causes a piston 6 to reciprocate. Consequently, a crankshaft 7 of the engine 1 rotates. Then, after being combusted in the combustion chamber 2, the air-fuel mixture is discharged as exhaust gases from the combustion chamber 2 to an exhaust passage 8. A starter 12 is connected to the crankshaft 7 and rotates the crankshaft 7 when the engine 1 is started.

The combustion chamber 2 and the intake passage 3 are communicated/blocked by through the actuation of an intake valve 13. The combustion chamber 2 and the exhaust passage 8 are communicated/blocked by through the actuation of an exhaust valve 14. During an intake stroke of a cylinder, the intake valve 13 is opened and then closed by rotation of an intake camshaft 18 to which rotation of the crankshaft 7 is transmitted. During an exhaust stroke of the cylinder, the exhaust valve 14 is opened and then closed by rotation of an exhaust camshaft 19 to which the rotation of the crankshaft 7 is transmitted.

An automobile equipped with the engine 1 includes an electronic control unit 21 that executes various controls related to the engine 1, such as fuel injection amount control. The electronic control unit 21 includes a CPU that executes various computation processes in association with the various controls, a ROM that stores programs and data required for such controls, a RAM that temporarily stores computation results obtained from the CPU and so forth, and input and output ports that receive and transmit signals from and to external devices.

The input port of the electronic control unit 21 is connected with various sensors and the like, which will be described below. The various sensors and the like include: a coolant temperature sensor 15 that detects the coolant temperature in the engine 1; an air-fuel ratio sensor 17 that outputs a signal indicating the oxygen concentration in exhaust gas; a cam position sensor 22 that outputs a signal indicating the rotational position of the intake camshaft 18; a crank position sensor 34 that outputs a signal indicating the rotation of the crankshaft 7 so that the signal is used to compute the engine speed and the like; an ignition switch 35 that is shifted to either one of four positions, "off", "accessory", "on", and "start", by the driver and that outputs a signal indicating the current position; and a fuel pressure sensor 36 that detects the pressure of fuel in the delivery pipe 11.

The output port of the electronic control unit 21 is connected with drive circuits for the fuel injection valve 4, the ignition plug 5, and the starter 12.

The electronic control unit 21 recognizes the operation condition of the engine based on the detection signals that are received from the various sensors, and transmits a command signal to the various drive circuits that are connected to the output ports in accordance with the operation condition of the engine. Accordingly, the various controls in the engine 1 that include fuel injection control, ignition timing control, and drive control of the starter 12 are executed through the electronic control unit 21.

Figure 2:
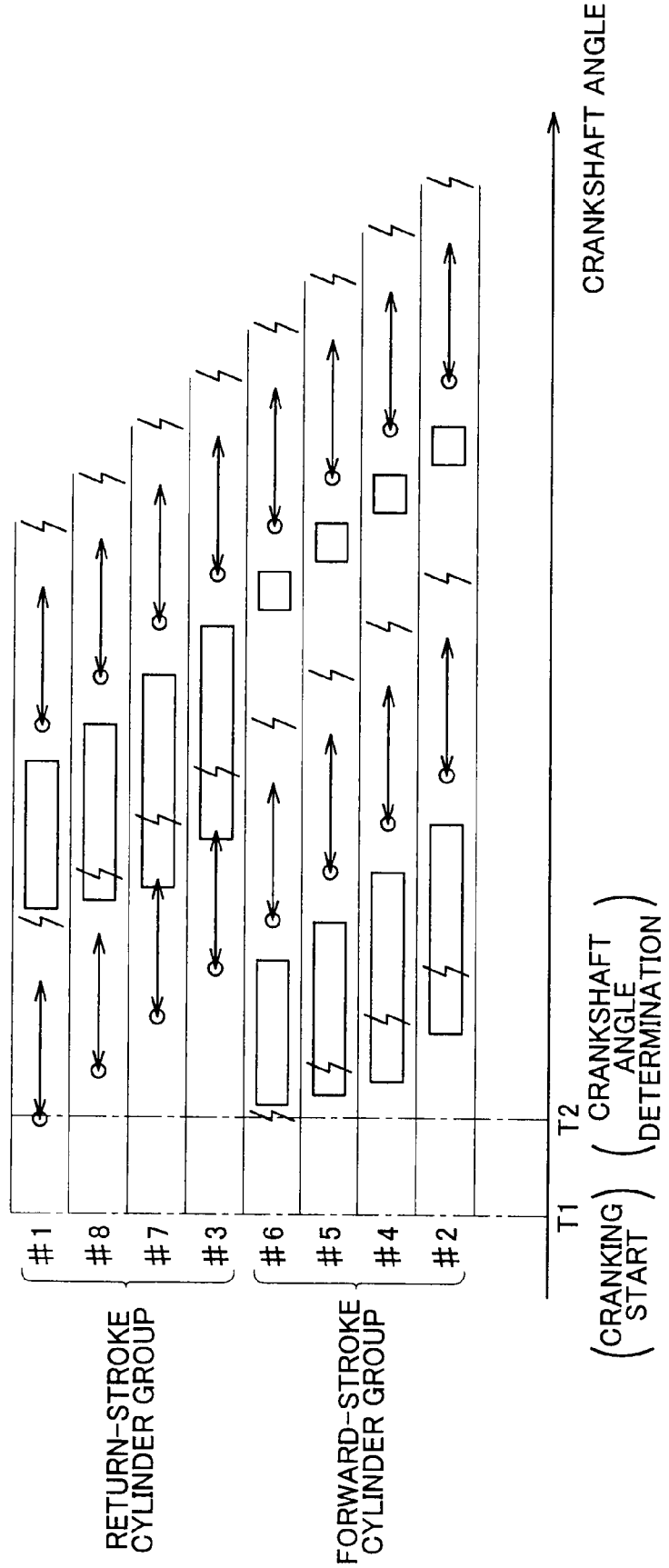
FIG. 2 is a timing chart that shows an actuation mode of an intake valve, a fuel injection mode, and an ignition mode in each of cylinders (#1 to #8) with respect to changes in a crankshaft angle during starting the engine.

Next, the various controls related to starting of the engine 1 will be described with reference to a timing chart in FIG. 2. FIG. 2 shows an actuation mode of the intake valve 13, a fuel injection mode, and an ignition mode in each of cylinders (#1 to #8) with respect to a change in a crankshaft angle when the engine 1 is started.

To start the engine 1, when the ignition switch 35 is shifted to the "on" position, a start-up injection amount command value that corresponds to the required amount of fuel is calculated. Then, the position of the ignition switch 35 is shifted from "on" to "start", the starter 12 is driven to start cranking (timing T1). When the cranking is started, the crankshaft angle is determined based on the signals output from the cam position sensor 22 and the crank position sensor 34 in association with the rotation of the engine (timing T2).

After the crankshaft angle is determined, an amount of fuel corresponding to the start-up injection amount command value is injected at the intake passage 3 to the combustion chamber 2 through drive control of the fuel injection valve 4 in each cylinder. Based on fuel pressure in the delivery pipe 11 that supplies fuel to the fuel injection valve 4, the amount of time required to inject the amount of fuel corresponding to the start-up injection amount command value under the fuel pressure is computed (hereinafter "fuel injection period"). Accordingly, the fuel injection valve 4 is opened for the fuel injection period to inject the required amount of fuel.

Then, the amount of fuel corresponding to the start-up injection amount command value is injected. When the air-fuel mixture is ignited by the ignition plug 5 and is combusted in the combustion chamber 2, the engine speed increases, and the engine 1 starts the self-sustained operation. After the amount of fuel corresponding to the start-up injection amount command value is injected in all the cylinders, fuel injection amount control and fuel injection timing control during the normal engine operation are executed based on the engine operation conditions such as the engine speed and engine load.

The cylinders (#1 to #8) in the engine 1 are grouped into a forward-stroke cylinder group or a return-stroke cylinder group. In the forward-stroke cylinder group, the amount of fuel corresponding to the start-up injection amount command value may be injected from the determination of the crankshaft angle (T2 onward) by an early period of the first intake valve 13 (#6, #5, #4, and #2 cylinders in this example) opening. In the return-stroke cylinder group, the amount of fuel corresponding to the start-up injection amount command value cannot be injected from the determination of the crankshaft angle by the early period of the first intake valve 13 (#1, #8, #7, and #3 cylinders in this example) opening.

As a fuel injection mode to inject the amount of fuel corresponding to the start-up injection amount command value after the determination of the crankshaft angle, a fuel injection mode in which the amount of fuel in the combustion chamber 2 corresponds to a required value for starting the engine 1 when the fuel in the combustion chamber 2 is combusted may be employed.

However, if a blended fuel of gasoline and alcohol with a high alcohol concentration is used, adoption of the fuel injection mode that is set for use of gasoline only reduces the startability of the engine 1. This is related to a decrease in volatility of the blended fuel in comparison with pure gasoline. If the fuel injection mode that is used for gasoline only is executed after the crankshaft angle has been determined without consideration of such volatility characteristics of the mixed fuel, the amount of fuel injected into the combustion chamber 2 after the crankshaft angle has been determined is insufficient to start the engine 1. As a result, the fuel is not favorably combusted in the combustion chamber 2, and the startability of the engine 1 deteriorates.

In view of the above problems, in this embodiment when the fuel with a high alcohol concentration, a fuel injection mode for a blended fuel with a high alcohol concentration is set as the fuel injection mode so that the amount of fuel in the combustion chamber 2 is sufficient for the required value for starting the engine 1 of the combustion chamber 2 is combusted in each cylinder after the determination of the crankshaft angle. If the fuel has a high concentration of alcohol, the fuel injection mode after the crankshaft angle has been determined is shifted to the fuel injection mode for fuel with a high alcohol concentration. Then, the fuel is injected from the fuel injection valve 4 in each cylinder after the determination of the crankshaft angle so as to execute the fuel injection mode for fuel with a high alcohol concentration.

The fuel injection mode for fuel with a high alcohol concentration is set such that the fuel injection mode can respond to a high alcohol concentration in the fuel, or in other words, the amount of fuel in the combustion chamber 2 is sufficient for the required value for starting the engine 1 when the fuel in the combustion chamber 2 is combusted in each cylinder after the crankshaft angle is determined. Therefore, when the fuel in the combustion chamber 2 is combusted after the crankshaft angle is determined, it is possible to prevent insufficient combustion of the fuel in the combustion chamber 2 that is caused by a decrease in volatility of the fuel with a high alcohol concentration. Consequently, it is possible to prevent deterioration in startability of the engine 1 that is caused by insufficient fuel combustion associated with shortage of the fuel.

Figure 3:
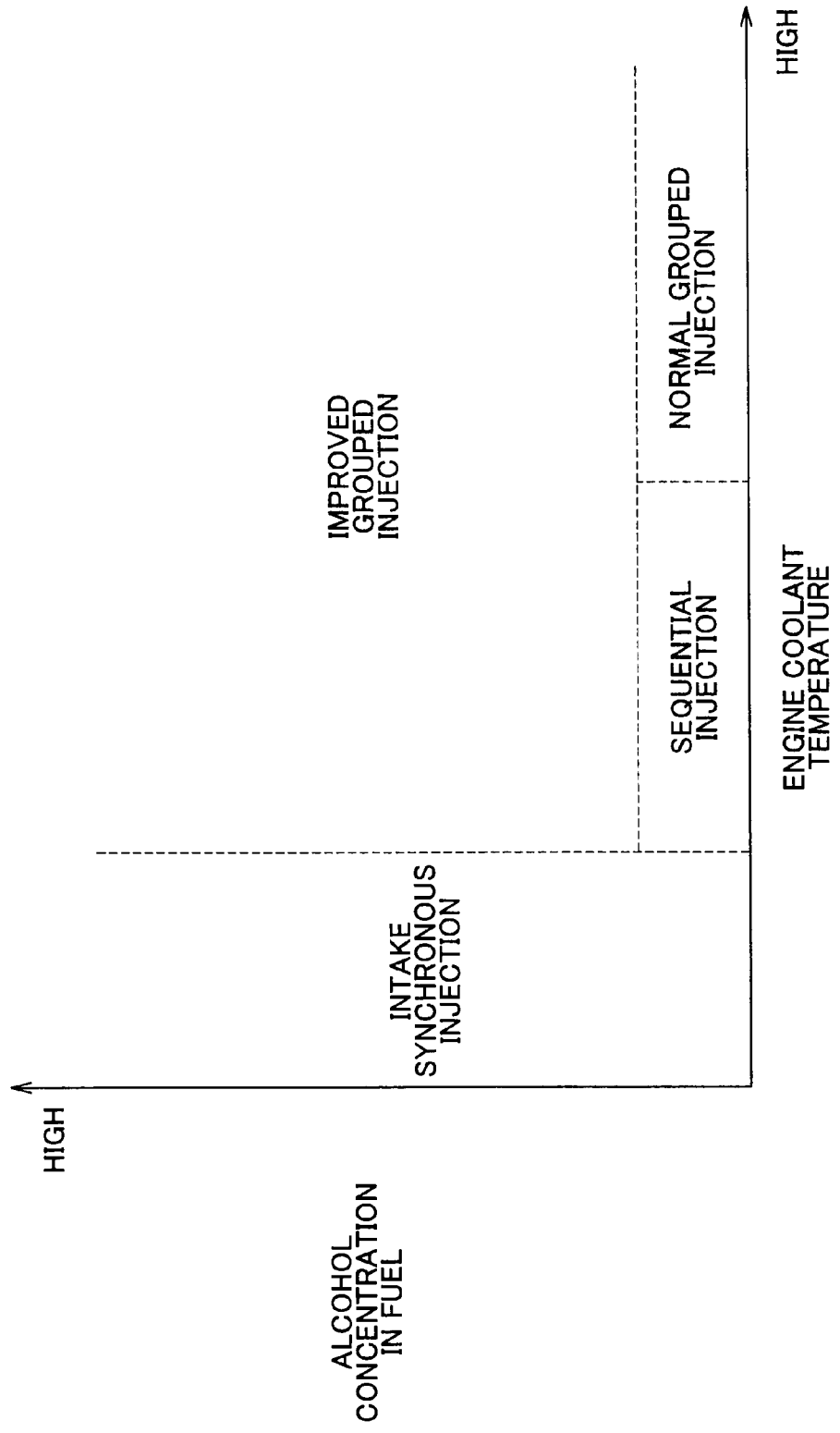
FIG. 3 is a diagram that illustrates embodiments of the fuel injection mode based on the engine coolant temperature and an alcohol concentration after the crankshaft angle is determined.

Next, the fuel injection mode and selecting thereof after the determination of the crankshaft angle will be described with reference to FIG. 2 to FIG. 6. As shown in FIG. 3, the fuel injection mode after the determination of the crankshaft angle upon starting the engine 1 is selected among sequential injection, normal grouped injection, improved grouped injection, or intake synchronous injection based on the coolant temperature in the engine 1 (that corresponds to the temperature of the engine 1) and the alcohol concentration in fuel. Of these fuel injection modes, the improved grouped injection is executed as the fuel injection mode for fuel with a high alcohol concentration. For the value for the alcohol concentration in fuel, a value that is assumed and stored based on a signal outputted from the air-fuel ratio sensor 17 during the engine operation immediately after refueling can be used. Or, an alcohol concentration sensor may be provided in the fuel tank or the like. Based on a signal from the sensor, the alcohol concentration in the fuel may be computed for use.

A detailed description will hereinafter be made on each of the fuel injection modes to inject fuel corresponding to the start-up injection amount command value, which are the sequential injection, the normal grouped injection, the improved grouped injection, and the intake synchronous injection.

[Sequential injection] In the sequential injection, as shown in FIG. 2, fuel amount corresponding to the start-up injection amount command value is injected in each cylinder at an early stage in the opening period of the intake valve 13 in consideration of improvement in exhaust emission of the engine 1. The reason why the exhaust emission can be improved by injecting the fuel in the early period of the intake valve 13 opening is because it takes a certain time for the fuel to enter the combustion chamber 2 since being injected, and thus the vaporized fuel tends to enter the combustion chamber 2, which suppresses entry and combustion of the fuel in a liquid state in the combustion chamber 2. If liquid fuel is combusted in the combustion chamber 2, the amount of hydrocarbon (HC) and smoke (soot) in the exhaust emissions are increased. However, such increase in the exhaust pollutants may be suppressed though the sequential injection.

Figure 4:
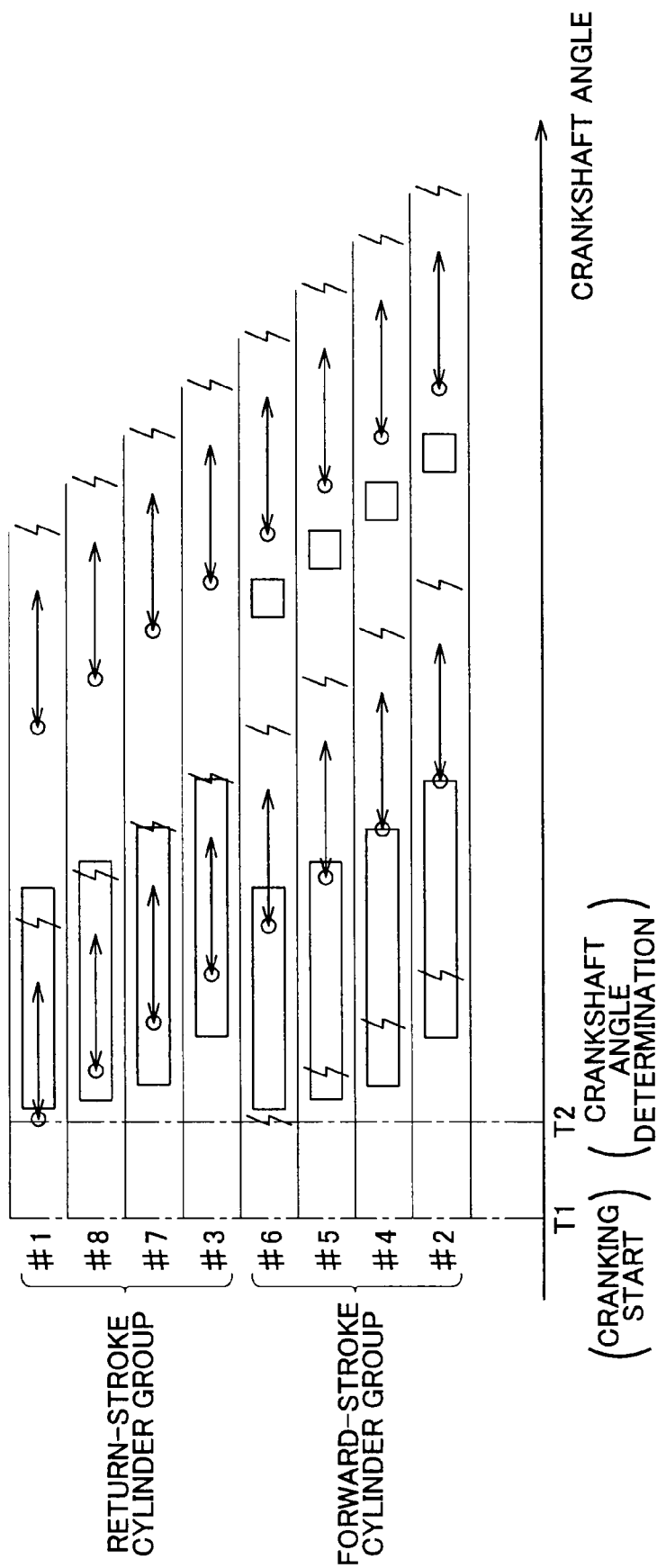
FIG. 4 is a timing chart that indicates the actuation mode of the intake valve, the fuel injection mode, and the ignition mode in each of the cylinders (#1 to #8) with respect to the changes in the crankshaft angle during starting the engine.

[Normal grouped injection] In the normal grouped injection, cylinders at the same position of a piston in the forward-stroke cylinder group and the return-stroke cylinder group are grouped. Then, as shown in FIG. 4, the amount of fuel corresponding to the start-up injection amount command value is injected at the same start timing for the same injection period in the cylinders of the same group. In consideration of the startability of the engine 1, it is conceivable that the injection of fuel corresponding to the start-up injection amount command value is started in the normal grouped injection so as to be completed by the early period of the intake valves 13 opening in the cylinders of the forward-stroke cylinder group.

If the injection of fuel corresponding to the start-up injection amount command value continues after the early stage in the opening period of the intake valve 13, the fuel will not be efficiently supplied. It is because the supply of fuel into the combustion chamber 2 is interfered with either by a closing movement of the intake valve 13 from a fully open state in a late period of the intake valve opening or by the closed intake valve 13. Such inefficiency in the fuel supply can cause deterioration in the startability of the engine 1. However, the deterioration in the startability can be suppressed by the above setting of the fuel injection start timing in the normal grouped injection.

Figure 5:
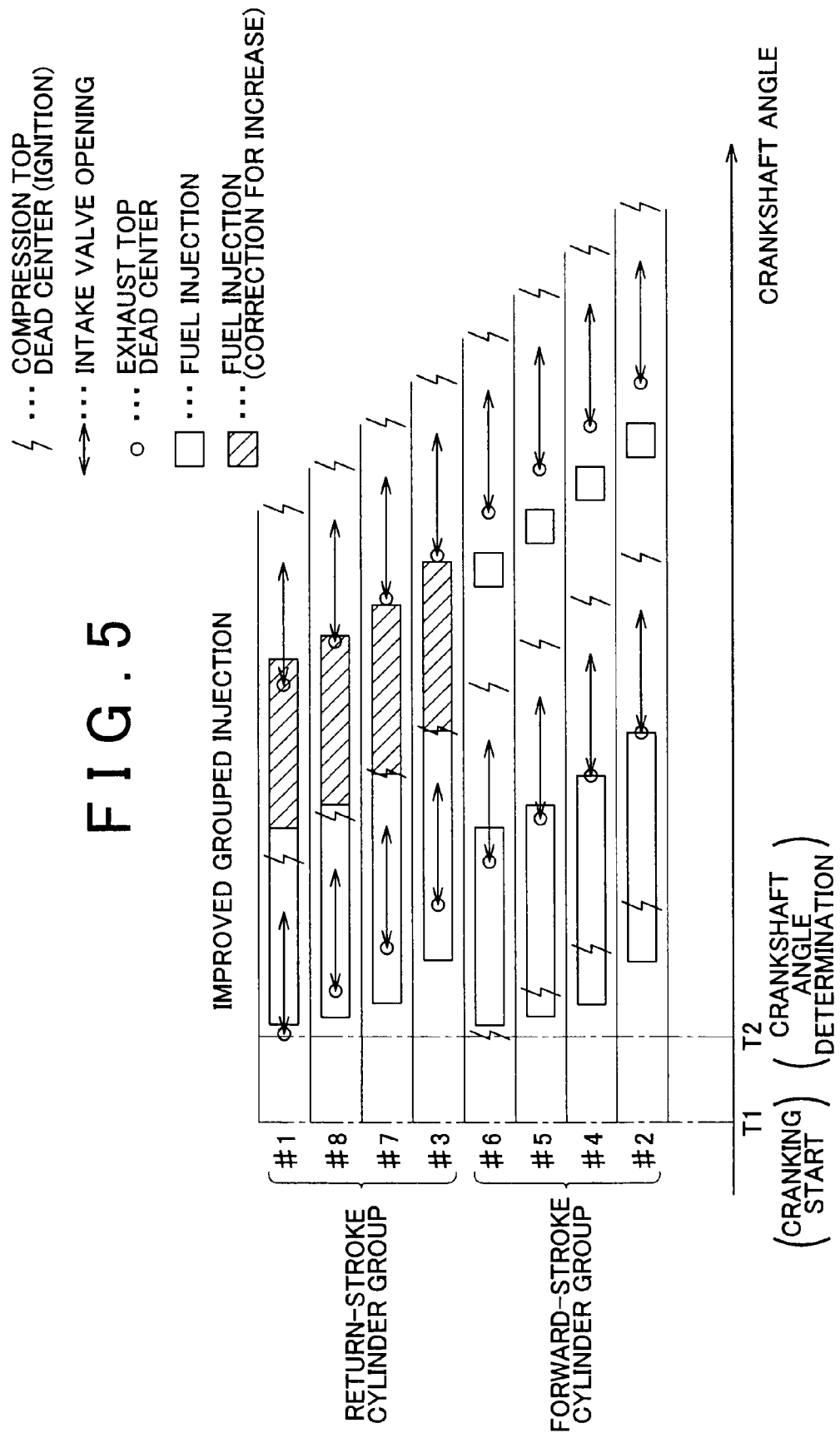
FIG. 5 is a timing chart that indicates the actuation mode of the intake valve, the fuel injection mode, and the ignition mode in each of the cylinders (#1 to #8) with respect to the changes in the crankshaft angle during starting the engine.

[Improved grouped injection] In the improved grouped injection, the cylinders at the same position of the piston in the forward-stroke cylinder group and the return-stroke cylinder group are grouped. Then, as shown in FIG. 5, the injection amount of fuel corresponding to the start-up injection amount command value is simultaneously started in the cylinders of the same group. However, the start-up injection amount command value in the cylinders of the return-stroke cylinder group is corrected to be larger than the start-up injection amount command value used for the fuel injection in the cylinders of the forward-stroke cylinder group. Therefore, the fuel injection in the cylinders of the return-stroke cylinder group by the improved grouped injection is executed in higher volume (longer) than the fuel injection in the cylinders of the forward-stroke cylinder group by the improved grouped injection by hatched areas shown in the drawing.

If the normal grouped injection is executed such that the start-up injection amount command value is the same among the forward-stroke cylinder group and the return-stroke cylinder group, following problems may occur in the cylinders of the return-stroke cylinder group. In the return-stroke cylinder group, a time from the beginning of the fuel injection to the fuel combustion is extended. In addition, due to the decrease in volatility of the fuel with a high alcohol concentration, a large amount of the injected fuel is adhered to an inner wall of the intake passage 3 and the like. If the large amount of the injected fuel is adhered to the inner wall of the intake passage 3 and the like as described above, the fuel remains to be adhered to the inner wall and the like when the fuel is combusted in the combustion chamber 2 (in an example of the drawing, when the second ignition is executed after the determination of the crankshaft angle). Thus, the amount of fuel in the combustion chamber 2 is reduced. As a result, the fuel combustion is not favorably executed in the cylinders of the return-stroke cylinder group. Therefore, the startability of the engine 1 deteriorates.

However, the fuel injection amount in the cylinders of the return-stroke cylinder group is corrected to be increased in the improved grouped injection as described above. Accordingly, even when the injected fuel in the cylinders adheres to the inner wall of the intake passage 3 and the like, it is possible to prevent a decrease in the fuel amount in the combustion chamber 2 when the fuel is combusted in the combustion chamber 2. Therefore, it is possible to prevent insufficient fuel combustion in the cylinders of the return-stroke cylinder group that is caused by the decrease in the fuel amount in the combustion chamber 2 in the cylinders after starting the engine 1 when the fuel has a high alcohol concentration. Consequently, the deterioration in the startability of the engine 1 can be prevented.

Figure 6:
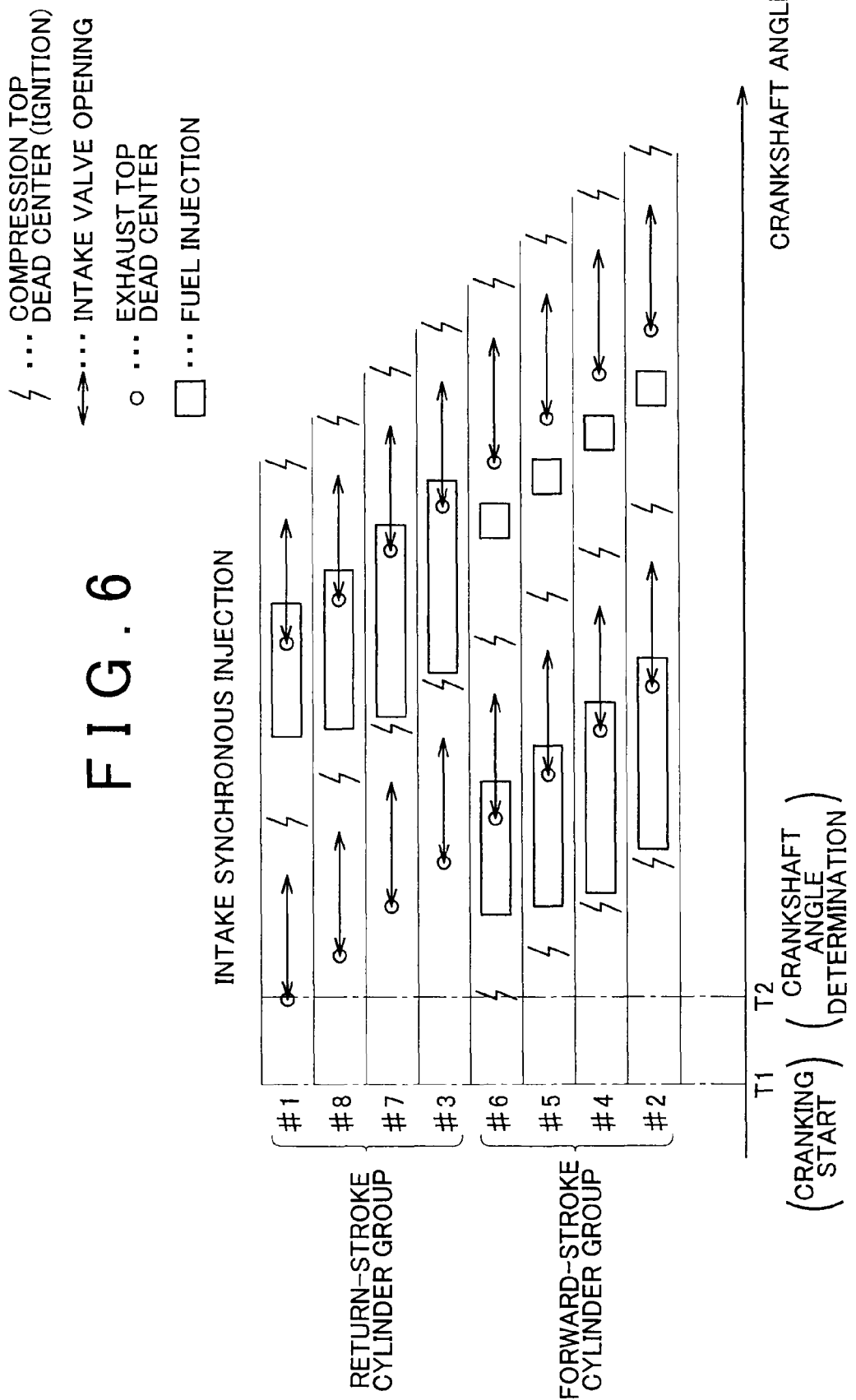
FIG. 6 is a timing chart that indicates the actuation mode of the intake valve, the fuel injection mode, and the ignition mode in each of the cylinders (#1 to #8) with respect to the changes in the crankshaft angle during starting the engine.

[Intake synchronous injection] In the intake synchronous injection, as shown in FIG. 6, the fuel injection is started in each cylinder such that the injection amount of fuel corresponding to the start-up injection amount command value from the fuel injection valve 4, or in other words, at inside of the intake passage 3 to the combustion chamber 2 is completed in the early period of the intake valve 13 opening in each cylinder. With execution of the fuel injection as described above, even when the coolant temperature in the engine 1 (that corresponds to the temperature of the engine 1) is extremely low, the fuel is efficiently supplied to the combustion chamber 2. Therefore, the favorably startability of the engine 1 can be promised by the fuel combustion in the combustion chamber 2.

The description has been made so far on the sequential injection, the normal grouped injection, the improved grouped injection, and the intake synchronous injection as the fuel injection modes for the injection of fuel corresponding to the start-up injection amount command value after the determination of the crankshaft. As shown in FIG. 3, these fuel injection modes are selected based on the coolant temperature in the engine 1 and the alcohol concentration in the fuel. Then, in order to execute the selected fuel injection mode, the fuel is injected from the fuel injection valve 4 in each cylinder after the crankshaft angle is determined.

More specifically, when the fuel has a high alcohol concentration, the improved grouped injection is executed. In this improved grouped injection, the fuel injection amount in the cylinders of the return-stroke cylinder group is corrected to be larger than the fuel injection amount in the cylinders of the forward-stroke cylinder group. Therefore, when the fuel has a high alcohol concentration, and the fuel is combusted in the cylinders of the return-stroke cylinder group after starting the engine, it is possible to prevent the insufficient fuel combustion that is caused by the decrease in the fuel amount in the combustion chamber 2. Consequently, the deterioration in startability of the engine 1 can be prevented.

Figure 7:
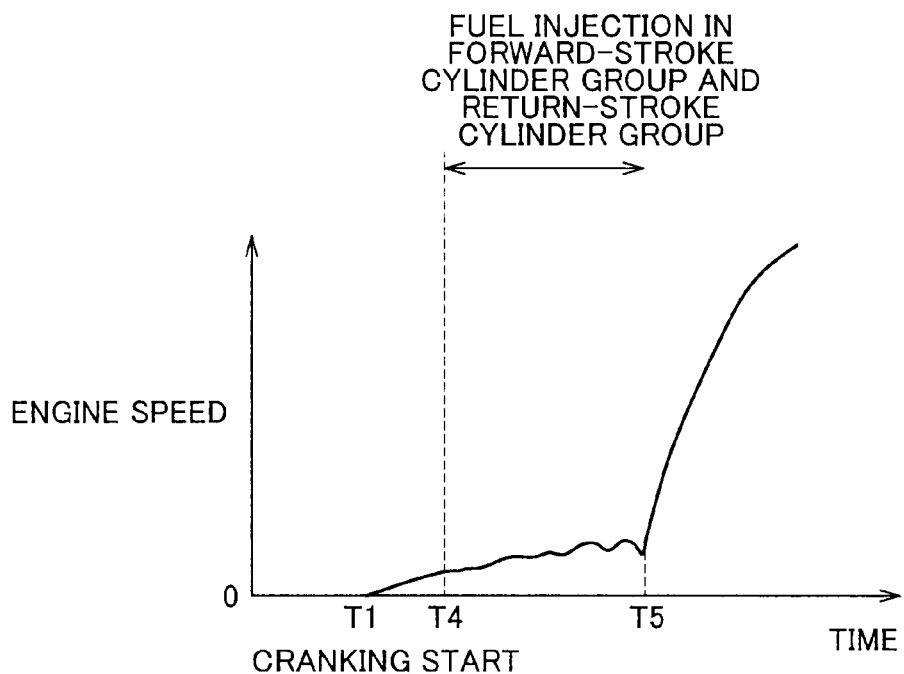
FIG. 7 is a time chart that shows changes in the engine speed over time after starting the engine.

The normal grouped injection is executed when the fuel has a low alcohol concentration, and when the coolant temperature in the engine 1 (that corresponds to the temperature of the engine 1) is high. In this normal grouped injection, as shown in FIG. 7, the amount of fuel corresponding to the start-up injection amount command value is injected in the cylinders of the forward-stroke cylinder group and the return-stroke cylinder group (timing T4 onward). First, the fuel is combusted in the combustion chambers 2 in the cylinders of the forward-stroke cylinder group. Due to the decreased viscosity of lubricant in the engine 1 by the high temperature of the engine 1, an engine speed rapidly increases with respect to the combustion (timing T5). When the engine speed increases as described above, it is impossible to avoid shortening of a time until the fuel is combusted in the combustion chambers 2 in the cylinders of the return-stroke cylinder group. However, in the normal grouped injection, the fuel is injected in the cylinders of the return-stroke cylinder group at the same start timing for the same injection period as the fuel injection in the cylinders of the forward-stroke cylinder group. Accordingly, it is possible to avoid insufficient injection of fuel corresponding to the start-up injection amount command value in the cylinders of the return-stroke cylinder group that is caused by the above rapid increase in the engine speed, and consequently, by shortening of the time until the fuel is combusted in the combustion chambers 2 in the cylinders of the return-stroke cylinder group. Therefore, it is possible to prevent the insufficient fuel combustion in the combustion chamber 2 that is caused by the insufficient injection of the fuel in the above amount in the cylinders of the return-stroke cylinder group. Consequently, it is possible to prevent the deterioration in the startability of the engine 1.

The sequential injection is executed when the fuel has a low alcohol concentration, and when the coolant temperature in the engine 1 (that corresponds to the temperature of the engine 1) is low. In this sequential injection, as described above, it is possible to prevent deterioration in exhaust emission that is caused by the increased amounts of hydrocarbon (HC) and smoke (soot) in exhaust gases. In this sequential injection, the amount of fuel corresponding to the start-up injection amount command value is injected in the cylinders of the forward-stroke cylinder group, and the fuel is combusted in the combustion chambers 2 of the same cylinders. At this time, because the temperature of the engine 1 is low, and because the viscosity of the lubricant is high, the engine speed does not increase rapidly with respect to the combustion. Accordingly, the time until the fuel combustion in the combustion chambers 2 in the cylinders of the return-stroke cylinder group is not shortened due to the rapid increase in the engine speed. In addition, it is possible to prevent insufficient combustion of fuel corresponding to the start-up injection amount command value in the cylinders of the return-stroke cylinder group. Therefore, it is possible to prevent the deterioration in startability of the engine 1 that is caused by insufficient combustion of the fuel.

Meanwhile, when the coolant temperature in the engine 1 (that corresponds to the temperature of the engine 1) is extremely low, the intake synchronous injection is executed regardless of the alcohol concentration in the fuel. In the intake synchronous injection, as described above, the fuel is efficiently supplied to the combustion chamber 2 even if the coolant temperature is extremely low. Therefore, the fuel is combusted favorably, and thus the engine 1 may be started favorably.

Next, the computation of start-up injection command values Q1 and Q2 used in the improved grouped injection as the fuel injection mode for fuel with a high alcohol concentration will be described. In the improved grouped injection, the start-up injection amount command value used for fuel combustion in the cylinders of the return-stroke cylinder group is corrected to be larger than the start-up injection amount command value used for fuel injection in the cylinders of the forward-stroke cylinder group. More specifically, the start-up injection amount command value used for fuel injection in the cylinders of the forward-stroke cylinder group is denoted by "Q1". The start-up injection amount command value used for fuel combustion in the cylinders of the return-stroke cylinder group is denoted by "Q2". These command values Q1 and Q2 are computed as described below with inclusion of the above correction for increase.

The start-up injection amount command value Q1 used for fuel injection in the cylinders of the forward-stroke cylinder group is computed based on the coolant temperature (that corresponds to the temperature of the engine 1) and the alcohol concentration in the fuel the engine 1 is started. As the coolant temperature decreases and the alcohol concentration in the fuel increases, the fuel injected from the fuel injection valve 4 tends to be adhered to the inner wall of the intake passage 3 due to the decrease in volatility. Accordingly, as the coolant temperature decreases and the alcohol concentration in the fuel increases, the amount of fuel that enters the combustion chamber 2 decreases when the amount of fuel corresponding to the start-up injection amount command value Q1 is injected in the cylinders of the forward-stroke cylinder group. In consideration of such tendencies, the start-up injection amount command value Q1, which is computed as described above, is set to be larger with the decrease in the coolant temperature and the increase in the alcohol concentration in the fuel so that the amount of fuel entering the combustion chamber 2 corresponds to the required value for starting the engine 1.

Meanwhile, the start-up injection amount command value Q2 that is used for fuel injection in the cylinders of the return-stroke cylinder group is "Q1·K" that is a value obtained by multiplying the start-up injection amount command value Q1, which is computed as described above, by an increasing correction coefficient K. In other words, multiplication of the start-up injection amount command value Q1 by the increasing correction coefficient K gives the start-up injection amount command value Q2. Thus, it can be said that the start-up injection amount command value Q2 is a value corrected to be larger than the start-up injection amount command value Q1 by the increasing correction coefficient K (an increasing correction value). The increasing correction coefficient K is computed based on the coolant temperature and the alcohol concentration such that the fuel amount in the combustion chamber 2 matches the required value for starting the engine 1 when the fuel is combusted in the combustion chamber 2 after the injection of fuel whose amount corresponds to the start-up injection amount command value Q2 in the cylinders of the return-stroke cylinder group. In other words, the start-up injection amount command value Q2 is computed based on the coolant temperature and the alcohol concentration at starting the engine 1 in order to prevent shortage of the fuel in the combustion chamber 2.

Figure 8:
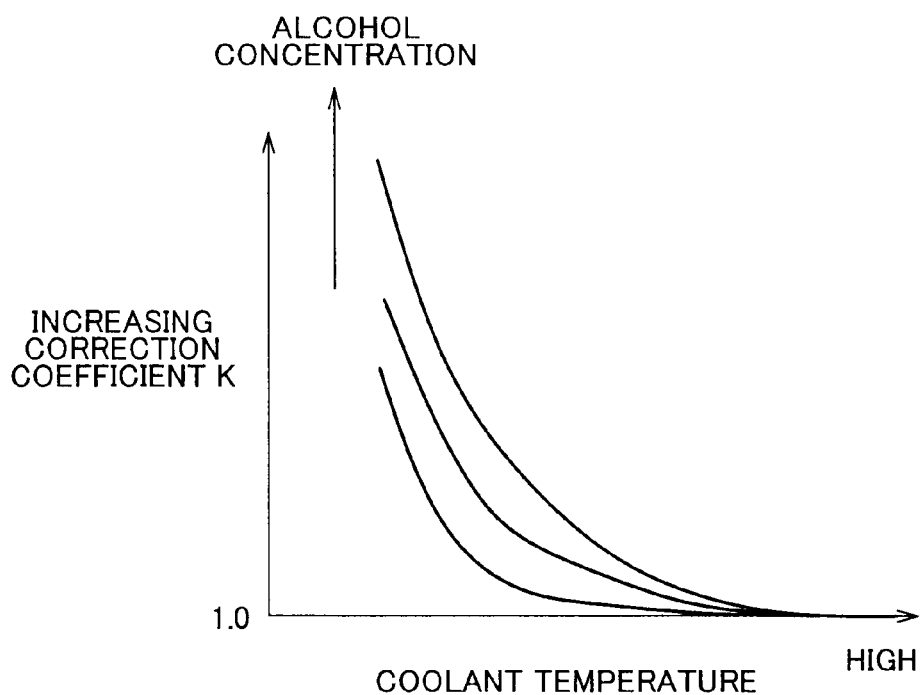
FIG. 8 is a graph that shows transition of an increasing correction coefficient K, which is used in grouped injection after starting the engine, with respect to changes in the engine coolant temperature and the alcohol concentration in fuel.

As shown in FIG. 8, the increasing correction coefficient K, which is computed as above, is increased from "1.0" with the decrease in the coolant temperature at starting the engine 1 and the increase in alcohol concentration in the fuel. During the improved grouped injection, the volatility of the fuel is not decreased dramatically in a range with high coolant temperature and a low alcohol concentration. Thus, the increasing correction coefficient K approximates "1.0", and the correction for increase in the fuel injection amount is terminated in the cylinders of the return-stroke cylinder group. Consequently, the start-up injection amount command value Q2 approximates the start-up injection amount command value Q1.

Figure 9:
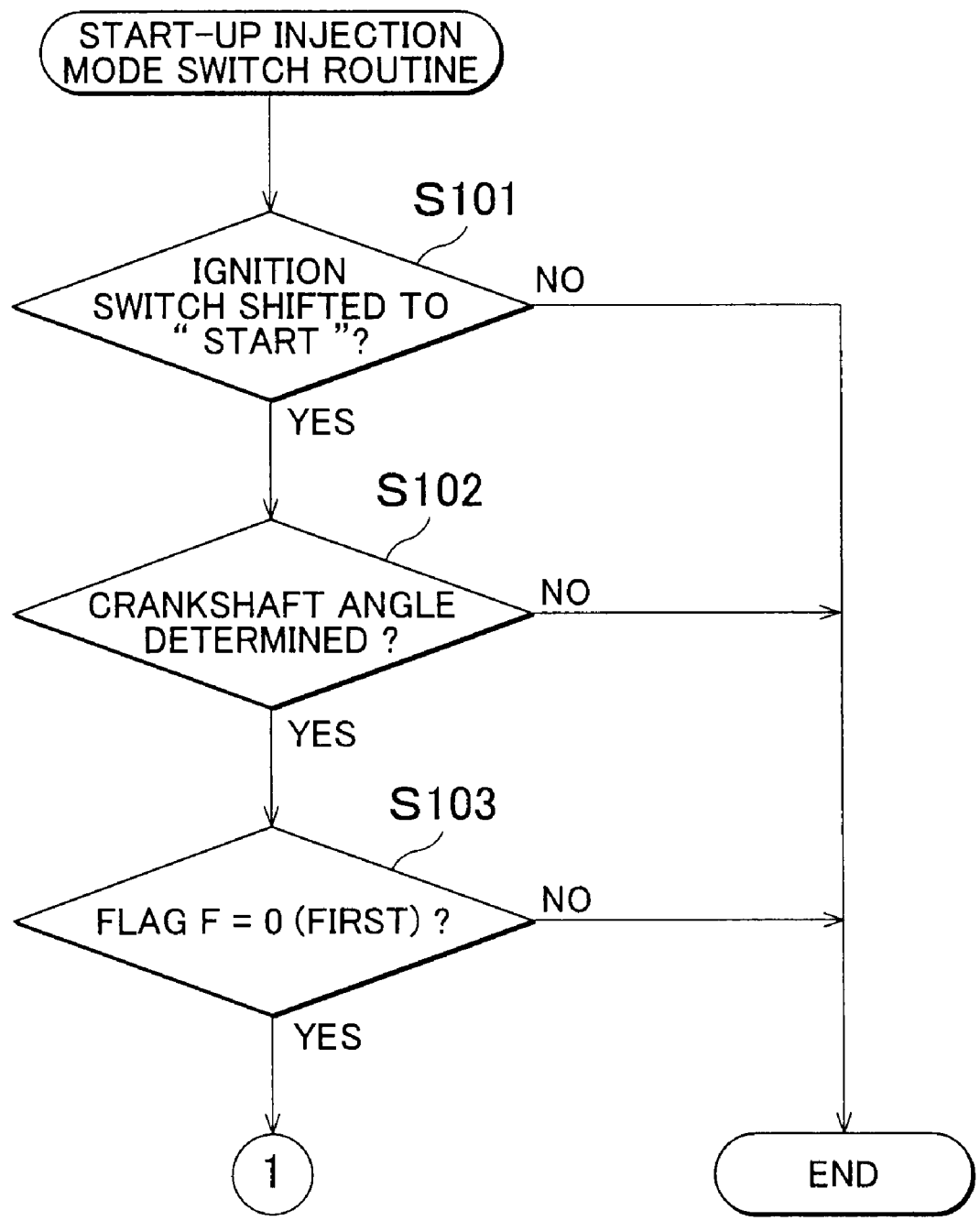
FIG. 9 is a flowchart that shows switching procedure of the fuel injection mode after starting the engine and the determination of the crankshaft angle, and that also shows procedure to execute the fuel injection mode.

Next, a description will be made on selection of the fuel injection mode after starting the engine and the determination of the crankshaft angle and on procedures to execute the fuel injection mode with reference to flowcharts in FIG. 9 and FIG. 10 that show a start-up injection mode switch routine. This start-up injection mode switch routine is executed periodically through the electronic control unit 21, for example, by interrupt per a predetermined time.

In this routine, it is determined whether the ignition switch 35 has been shifted to the "start" position (S101 in FIG. 9) and whether the crankshaft angle has been determined (S102). If both of the step S101 and the step S102 are true, it is determined whether a flag F is "0 (first)" in order to determine whether the above determinations are made for the first time after starting the engine 1 (S103). If step S103 is true, the fuel injection mode after the determination of the crankshaft angle is selected in accordance with the coolant temperature in the engine 1 (that corresponds to the temperature of the engine 1) and the alcohol concentration in the fuel. Then, the processes to execute the fuel injection mode are performed (steps S104 to S111 in FIG. 10).

In these sequential processes, it is first determined in step S104 whether the coolant temperature of the engine 1 is extremely low. More specifically, it is determined whether the coolant temperature is too low (for example, −30° C. or lower) to favorably start the engine without execution of intake synchronous injection. After it is determined to be true in this step, the routine proceeds to step S105 to execute the intake synchronous injection. On the other hand, if it is determined to be false in step S104, the routine proceeds to step S106.

In step S106, it is determined whether the alcohol concentration in the fuel is high. More specifically, it is determined whether the alcohol concentration in the fuel is so high (for example, 15% or higher) that, without executing the improved grouped injection, there is possible shortage of fuel in the combustion chamber 2 when the fuel is combusted in the combustion chambers 2 in the cylinders of the return-stroke cylinder group. After it is determined to be true in this step, the routine proceeds to step S107 to execute the improved grouped injection. On the other hand, if it is determined false in step S106, it is determined that the alcohol concentration in the fuel is low, and the routine proceeds to step S108.

In step S108, it is determined whether the coolant temperature in the engine 1 is high. More specifically, it is determined whether the coolant temperature is so high (for example, 15° C. or higher) that the decrease in viscosity of the lubricant for the engine 1 may cause the rapid increase in engine speed when the fuel is combusted in the cylinders of the forward-stroke cylinder group. If the engine speed increases rapidly as described above, there is a possibility that, without execution of the normal grouped injection, the amount of fuel corresponding to the start-up injection amount command value cannot be fully injected by the time that the fuel is combusted in the cylinders of the return-stroke cylinder group. Therefore, when it is determined to be true in step S108, the routine proceeds to step S109, and the normal grouped injection is executed.

On the other hand, if it is determined to be false in step S108, it is determined that the coolant temperature in the engine 1 is low. More specifically, it is determined that the coolant temperature is low (for example, below 15° C.) at which the viscosity of the lubricant for the engine 1 is lowered to the extent that the engine speed does not increase rapidly when the fuel is combusted in the cylinders of the forward-stroke cylinder group. When the engine speed does not increase rapidly, the amount of fuel corresponding to the start-up injection amount command value may be fully injected in the cylinders of the return-stroke cylinder group during the sequential injection. Accordingly, the improvement in exhaust emission can be made on hydrocarbon (HC) and smoke (soot) by execution of the sequential injection. Therefore, when it is determined to be false in step S108, the routine proceeds to step S110, and the sequential injection is executed.

When any one of the intake synchronous injection (S105), the improved grouped injection (S107), the normal grouped injection (S109), or the sequential injection (S110) is executed, the process proceeds to step S111, and the flag F is set to "1 (not first)". Therefore, when the process proceeds to the step S103 (FIG. 9) in the next cycle, it is determined to be false in the step. Consequently, steps S104 to S111 are skipped. It should be noted that the flag F is reset to "0" when the engine 1 is stopped.

The alcohol concentration in the fuel needs to be determined before step S106. If the current fuel amount is the same as the fuel amount the previous time when the alcohol concentration is determined, the previous alcohol concentration may be used as the current alcohol concentration in the fuel.

According to the embodiment that has been discussed so far in detail, the following effects are obtained.

(1) When the fuel has a high alcohol concentration, the fuel injection mode after the determination of the crankshaft angle is set to the fuel injection mode for fuel with a high alcohol concentration. Then, in order to execute the fuel injection in accordance with the fuel injection mode for fuel with a high alcohol concentration, the fuel is injected from the fuel injection valve 4 in each cylinder after the determination of the crankshaft angle. The fuel injection mode for fuel with a high alcohol concentration is set such that the fuel injection mode can respond to a high alcohol concentration in the fuel, or in other words, the amount of fuel in the combustion chamber 2 is sufficient for the required value for starting the engine 1 when the fuel in the combustion chamber 2 is combusted in each cylinder after the crankshaft angle is determined. Therefore, when the fuel in the combustion chamber 2 is combusted after the crankshaft angle is determined, it is possible to prevent insufficient combustion of the fuel in the combustion chamber 2 that is caused by the decrease in volatility of the fuel with a high alcohol concentration. Consequently, it is possible to prevent deterioration in startability of the engine 1 that is caused by insufficient fuel combustion associated with shortage of the fuel.

(2) The improved grouped injection is set as the fuel injection mode for fuel with a high alcohol concentration. The start-up injection amount command value for the cylinders in the return-stroke cylinder group is corrected to be larger than the start-up injection amount command value used for fuel injection in the cylinders of the forward-stroke cylinder group. Therefore, in the improved grouped injection, the fuel injection amount in the cylinders of the return-stroke cylinder group is corrected to be larger than the fuel injection amount in the cylinders of the forward-stroke cylinder group. Accordingly, in the return-stroke cylinder group, the time from the beginning of the fuel injection to the fuel combustion is extended. In addition, the volatility of fuel is decreased with a high alcohol concentration in the fuel. Because the large amount of the injected fuel is adhered to the inner wall of the intake passage 3 and the like, there is a possible decrease in the fuel in the combustion chamber 2 when the fuel is combusted in the combustion chamber 2. However, as described above, the fuel injection amount is corrected and increased in the cylinders of the return-stroke cylinder group. Accordingly, even when the injected fuel in the cylinders of the return-stroke cylinder group adheres to the inner wall of the intake passage 3 and the like, it is possible to prevent the decrease in the fuel amount in the combustion chamber 2 when the fuel is combusted in the combustion chamber 2. Therefore, it is possible to prevent the insufficient fuel combustion in the cylinders of the return-stroke cylinder group that is caused by the high alcohol concentration in the fuel and thus by the decrease in the fuel amount in the combustion chamber 2 after starting the engine 1. Consequently, it is possible to prevent the deterioration in startability of the engine 1.

(3) In the above improved grouped injection, as the alcohol concentration in the fuel is increased, and as the coolant temperature in the engine 1 is decreased, the fuel amount that adhered to the inner wall of the intake passage 3 and the like is increased due to the decreased volatility of the fuel when the fuel is injected in the cylinders of the return-stroke cylinder group. As a result, when the fuel is combusted in the combustion chambers 2 in the cylinders of the return-stroke cylinder group, the fuel amount in the combustion chambers 2 tends to decrease. However, in the improved grouped injection, the fuel injection amount (start-up injection amount command value Q2) in the cylinders of the return-stroke cylinder group is corrected to be increased with the increase in alcohol concentration in the fuel and the decrease in the coolant temperature in the engine 1 by the increasing correction coefficient K that is set based on the alcohol concentration in the fuel and the coolant temperature in the engine 1. Therefore, the decrease in the fuel in the combustion chamber 2 can be prevented precisely regardless of the alcohol concentration in the fuel and the coolant temperature in the engine 1 when the fuel is combusted in the combustion chambers 2 in the return-stroke cylinder group after execution of the improved grouped injection.

(4) The normal grouped injection is executed after the determination of the crankshaft angle when the fuel has a low alcohol concentration, and when the coolant temperature in the engine 1 (that corresponds to the temperature of the engine 1) is high. In this normal grouped injection, the amount of fuel corresponding to the start-up injection amount command value is injected at the same start timing for the same injection time in the cylinder of the return-stroke cylinder group and in the cylinder of the forward-stroke cylinder group that are grouped together by the position of the piston. Accordingly, even when the fuel is combusted in the combustion chambers 2 in the cylinders of the forward-stroke cylinder group, and, accompanied by the combustion, when the time until the fuel combustion in the combustion chambers 2 in the cylinders of the return-stroke cylinder group is shortened by the rapid increase in the engine speed, the amount of fuel corresponding to the start-up injection amount command value can be fully injected in the cylinders of the return-stroke cylinder group. Therefore, it is possible to prevent the insufficient fuel combustion in the combustion chamber 2 that is caused by insufficient fuel injection of the above amount in the cylinders of the return-stroke cylinder group. Consequently, it is possible to prevent the deterioration in startability of the engine 1.

(5) The sequential injection is executed after the determination of the crankshaft angle when the fuel has a low alcohol concentration, and when the coolant temperature in the engine 1 (that corresponds to the temperature of the engine 1) is low. In this sequential injection, the fuel injection is started in the early period with respect to the intake valve 13 opening. Accordingly, it takes a certain time for the fuel to enter the combustion chamber 2 since being injected, and thus the vaporized fuel tends to enter the combustion chamber 2, which suppresses entry and combustion of fuel in the liquid state in the combustion chamber 2. Therefore, it is possible to prevent deterioration in exhaust emission that is caused by entry and combustion of the liquid fuel in the combustion chamber 2, which increases the amounts of hydrocarbon (HC) and smoke (soot) in exhaust gases.

(6) The intake synchronous injection is executed after the determination of the crankshaft angle regardless of the alcohol concentration in the fuel when the coolant temperature in the engine 1 (that corresponds to the temperature of the engine 1) is extremely low. In this intake synchronous injection, the injection of fuel corresponding to the start-up injection amount command value from the fuel injection valve 4 is started in each cylinder so as to be completed in the early period of the intake valve 13 opening in each cylinder. Therefore, even when the coolant temperature is extremely low, the fuel can be efficiently supplied to the combustion chamber 2, and the favorable startability of the engine 1 can be achieved by the fuel combustion.

The above embodiment may be modified as described below, for example.

(a) The intake synchronous injection, the sequential injection, and the normal grouped injection are exemplified as fuel injection modes other than the fuel injection mode for fuel with a high alcohol concentration. However, all of these fuel injection modes may not be executed. Instead, some of the above fuel injection modes may be executed.

(b) The improved grouped injection is exemplified as the fuel injection mode for fuel with a high alcohol concentration. However, other fuel injection mode that is suited for fuel with a high alcohol concentration may be adopted.

(c) In the improved grouped injection, the correction for increase in the fuel injection amount in the cylinders of the return-stroke cylinder group may vary in multiple steps such as two or three steps similarly to either the coolant temperature or the alcohol concentration.

(d) In the improved grouped injection, the correction for increase in the fuel injection amount in the cylinders of the return-stroke cylinder group varies according to the coolant temperature of the engine 1 and the alcohol concentration in the fuel. However, the correction for increase may vary according to the alcohol concentration only.

(e) In the improved grouped injection, the correction for increase in the fuel injection amount in the cylinders of the return-stroke cylinder group needs not vary according to the coolant temperature and the alcohol concentration. The correction for increase may be fixed in advance by an experiment and the like to an appropriate value.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

In the present invention, the internal combustion engine, after the crankshaft angle is determined, may inject an amount of fuel corresponding to a start-up injection amount command value, that is being computed as a required fuel injection amount for starting the engine on the basis of an engine temperature and the alcohol concentration in fuel, from the fuel injection valve in each cylinder according to the determined fuel injection mode. The cylinders of the internal combustion engine may be grouped into a forward-stroke cylinder group that includes cylinders in which the amount of fuel that corresponds to the start-up injection amount command value can be injected by an early period of an intake valve opening after the determination of the crankshaft angle and a return-stroke cylinder group that includes cylinders in which the amount of fuel that corresponds to the start-up injection amount command value cannot be injected by the early period of the intake valve opening after the determination of the crankshaft angle. The fuel injection mode for fuel with the high alcohol concentration may be high alcohol concentration grouped injection in which, in the cylinders of the forward-stroke cylinder group, the injection of the fuel corresponding to the start-up injection amount command value is started so that the fuel injection is completed by the early period of the intake valve opening and in which, in the cylinders of the return-stroke cylinder group, the injection of the fuel corresponding to the start-up injection amount command value, that is corrected to be larger than the start-up injection amount command value that is used for the fuel injection in the cylinders of the forward-stroke cylinder group, is started at the same timing as the fuel injection in the cylinder of the forward-stroke cylinder group whose piston is in the same position as the piston in the cylinder of the return-stroke cylinder group.

According to the above configuration, when the fuel has a high alcohol concentration, the high alcohol concentration grouped injection is executed as the fuel injection mode for fuel with a high alcohol concentration after the determination of the crankshaft angle. In this high alcohol concentration grouped injection, the cylinders are grouped by the position of the piston in the forward-stroke cylinder group and the return-stroke cylinder group. In the cylinders of the same group, the amount of fuel corresponding to the start-up injection amount command value is simultaneously injected. In the cylinders of the return-stroke cylinder group, the start-up injection amount command value is corrected to be larger than the start-up injection amount command value for the forward-stroke cylinder group. Therefore, in the high alcohol concentration grouped injection, the fuel injection in the cylinders of the return-stroke cylinder group is executed larger in volume (longer) than the fuel injection in the cylinders of the forward-stroke cylinder group.

If the low alcohol concentration grouped injection in which the start-up injection amount command value is the same among the forward-stroke cylinder group and the return-stroke cylinder group is executed in this state, following problems may occur in the cylinders of the return-stroke cylinder group. In the return-stroke cylinder group, the period from the beginning of the fuel injection to the fuel combustion is extended. In addition, the volatility of fuel is decreased with a high alcohol concentration in the fuel. Thus, the large amount of the injected fuel is adhered to the inner wall of the intake passage and the like. If the large amount of the injected fuel is adhered to the inner wall of the intake passage and the like as described above, the fuel remains to be adhered to the inner wall and the like when the fuel is combusted in the combustion chamber. Thus, the fuel amount in the combustion chamber 2 is decreased. As a result, the fuel is not favorably combusted in the cylinders of the return-stroke cylinder group, and thus the startability of the internal combustion engine deteriorates.

However, in the high alcohol concentration grouped injection, the fuel injection amount in the cylinders of the return-stroke cylinder group is corrected for increase as described above. Accordingly, even if the injected fuel in the cylinders of the return-stroke cylinder group adheres to the inner wall of the intake passage and the like, it is possible to prevent the decrease in the fuel amount in the combustion chamber when the fuel is combusted in the combustion chamber. Therefore, it is possible to prevent the insufficient fuel combustion that is caused by the decrease in the fuel amount in the combustion chambers in the cylinders of the return-stroke cylinder group after starting the engine. Consequently, it is possible to prevent the deterioration in startability of the internal combustion engine.

In the present invention, the correction to increase the start-up injection amount command value in the cylinders of the return-stroke cylinder group in the high alcohol concentration grouped injection may be made by adding an increase correction value to the computed start-up injection amount command value. The increase correction value may be increased as the alcohol concentration in fuel increases.

According to the above configuration, in the high alcohol concentration grouped injection, the fuel is injected in the cylinders of the return-stroke cylinder group after the cranking is started and the crankshaft angle is determined. The correction for increase in the fuel injection amount is increased as the alcohol concentration in the fuel is increased. As the alcohol concentration in the fuel is increased, the amount of fuel that adheres to the inner wall of the intake passage and the like is increased due to the decrease in volatility of the fuel when the fuel is injected in the cylinders of the return-stroke cylinder group by the high alcohol concentration grouped injection. Consequently, when the fuel is combusted in the combustion chamber, the fuel amount in the combustion chamber tends to decrease. However, in the high alcohol concentration grouped injection, the correction for increase in the fuel injection amount in the cylinders of the return-stroke cylinder group is increased as the alcohol concentration is increased. Therefore, when the fuel is combusted in the combustion chamber after the injection, it is possible to precisely prevent the decrease in the fuel amount in the combustion chamber regardless of the alcohol concentration in the fuel.

In the present invention, the internal combustion engine, after the crankshaft angle is determined, may inject an amount of fuel corresponding to a start-up injection amount command value, that is being computed as a required fuel injection amount for starting the engine on the basis of an engine temperature and the alcohol concentration in the fuel, from the fuel injection valve in each cylinder according to the determined fuel injection mode. The cylinders of the internal combustion engine may be grouped into a forward-stroke cylinder group that includes cylinders in which the amount of fuel that corresponds to the start-up injection amount command value can be injected by an early period of an intake valve opening after the determination of the crankshaft angle and a return-stroke cylinder group that includes cylinders in which the amount of fuel that corresponds to the start-up injection amount command value cannot be injected by the early period of the intake valve opening after the determination of the crankshaft angle. The control section may set sequential injection or low alcohol concentration grouped injection as the fuel injection mode, in which the amount of fuel in the combustion chamber is a required value for engine start-up when the fuel in the combustion chamber is to be combusted for the first time in each cylinder after the determination of the crankshaft angle, when fuel has an alcohol concentration less than the predetermined concentration. The sequential injection may be set such that the injection of fuel corresponding to the start-up injection amount command value is started in each cylinder at a timing that reduces exhaust emissions of the internal combustion engine. The low alcohol concentration grouped injection may be set such that, in the cylinders of the forward-stroke cylinder group, the injection of the fuel corresponding to the start-up injection amount command value is started so that the injection is completed by the early period of the intake valve opening and that, in the cylinders of the return-stroke cylinder group, the injection of the fuel corresponding to the start-up injection amount command value is started at the same timing as the fuel injection in the cylinder of the forward-stroke cylinder group whose piston is in the same position as the piston in the cylinder of the return-stroke cylinder group. If the fuel has the alcohol concentration less than the predetermined concentration, the fuel injection mode after the determination of the crankshaft angle may be set to the sequential injection when the temperature of the internal combustion engine is lower than a predetermined temperature and to the low alcohol concentration grouped injection when the temperature of the internal combustion engine is higher than the predetermined temperature, and then the fuel is injected from the fuel injection valve in each cylinder after the determination of the crankshaft angle in order to execute the shifted fuel injection mode.

According to the above configuration, when the alcohol concentration in the fuel is low, the fuel injection mode for the injection of fuel corresponding to the start-up injection amount command value after the determination of the crankshaft angle is shifted either to the sequential injection or to the low alcohol concentration grouped injection in accordance with the engine temperature.

More specifically, after the crankshaft angle is determined, the fuel is injected from the fuel injection valve in each cylinder to execute the low alcohol concentration grouped injection when the engine temperature is high. In this low alcohol concentration grouped injection, the amount of fuel that corresponds to the start-up injection amount command value is injected in the cylinders of the forward-stroke cylinder group, and the fuel is combusted in the cylinders. Consequently, the engine speed increases rapidly with combustion due to the decrease in viscosity of the lubricant for the engine by the high engine temperature. When the engine speed increases rapidly as described above, it is impossible to avoid shortening of the time until the fuel is combusted in the combustion chambers in the cylinders of the return-stroke cylinder group. However, in the low alcohol concentration grouped injection, the fuel is injected at the same start timing for the same injection period in the cylinder of the return-stroke cylinder group and the cylinder of the forward-stroke cylinder group that belong to the same group. Accordingly, it is possible to prevent reductions of the time until the fuel is combusted in the cylinders of the return-stroke cylinder group that generally occurs when the engine speed is increased rapidly. Thus, the start-up injection amount command value of fuel is injected in the cylinders of the return-stroke cylinder group. Therefore, it is possible to prevent the insufficient fuel combustion in the combustion chamber that occurs when an insufficient amount of fuel is injected into the cylinders of the return-stroke cylinder group. Consequently, it is possible to prevent the deterioration in startability of the internal combustion engine.

Alternatively, if the engine temperature is low, the fuel is injected from the fuel injection valve in each cylinder to execute sequential injection after the crankshaft angle is determined. In this sequential injection, the injection of fuel corresponding to the start-up injection amount command value is started in each cylinder at a timing in consideration of the improvement in exhaust emission of the internal combustion engine, and more specifically, at an early timing with respect to the opening period of the intake valve. As described above, when the injection of fuel corresponding to the start-up injection amount command value is started at the early timing with respect to the opening period of the intake valve, it takes a certain time for the injected fuel to enter the combustion chamber, and thus, the vaporized fuel tends to enter the combustion chamber. Therefore, it is possible to suppress entry and combustion of the liquid fuel in the combustion chamber. If the liquid fuel enters the combustion chamber and is combusted therein, the amounts of hydrocarbon (HC) and smoke (soot) are increased to cause the deterioration in exhaust emission. Such deterioration in exhaust emission can be prevented by the sequential injection.

In the present invention, the internal combustion engine, after the crankshaft angle is determined, may inject an amount of fuel corresponding to a start-up injection amount command value, that is being computed as a required fuel injection amount for starting the engine on the basis of an engine temperature and the alcohol concentration in fuel, from the fuel injection valve in each cylinder according to the determined fuel injection mode. As the fuel injection mode in which the amount of fuel in the combustion chamber corresponds to the required value for starting the engine, when the engine temperature is lower than a predetermined low temperature and when the fuel in the combustion chamber is to be combusted in each cylinder after the determination of the crankshaft angle, intake synchronous injection may be set for each cylinder such that the injection of fuel whose amount corresponds to the start-up injection amount command value is started in each cylinder so that the injection is completed in the early period of the intake valve opening. When the engine temperature when starting the engine is lower than the predetermined low temperature, the fuel injection mode after the determination of the crankshaft angle may be set to the intake synchronous injection regardless of the alcohol concentration in fuel, and then the fuel is injected from the fuel injection valve in each cylinder after the determination of the crankshaft angle in order to execute the intake synchronous injection.

According to the above configuration, when the engine temperature is extremely low, the fuel injection mode for the injection of fuel corresponding to the start-up injection amount command value after the determination of the crankshaft angle is shifted to the intake synchronous injection regardless of the alcohol concentration in the fuel. Then, the fuel is injected from the fuel injection valve in each cylinder so as to execute the intake synchronous injection. In this intake synchronous injection, the injection of fuel corresponding to the start-up injection amount command value from the fuel injection valve, or in other words, from the intake passage to the combustion chamber is started in each cylinder so as to be completed at the early stage in the opening period of the intake valve. With the fuel combustion as described above, even when the engine temperature is extremely low, it is possible to effectively supply the above fuel to the combustion chambers, and thus, the internal combustion engine can be favorably started by the combustion of the above fuel in the combustion chambers.

What is claimed is:

1. A fuel injection control apparatus for an internal combustion engine, which is applied to an internal combustion engine that includes a fuel injection valve that injects fuel from an inside of an intake passage toward a combustion chamber in each cylinder, the control apparatus comprising:
a control section,
wherein the control section controls fuel injection from the fuel injection valve for each cylinder after a crank angle is determined through cranking for starting the engine, in a fuel injection mode in which an amount of the fuel present in the combustion chamber when the fuel in the combustion chamber is to be combusted in each cylinder after the crank angle is determined is brought to a value required to start the engine,
wherein in the internal combustion engine, after the crank angle is determined, the fuel in an amount corresponding to a start-up injection amount command value, which is calculated as a fuel injection amount required to start the engine based on an engine temperature and an alcohol concentration in the fuel, is injected from the fuel injection valve for each cylinder in a determined fuel injection mode,
wherein the cylinders of the internal combustion engine are grouped into a front stroke cylinder group that includes the cylinders in which the fuel in the amount corresponding to the start-up injection amount command value is injected by an early stage of a first valve opening period of an intake valve after the crank angle is determined, and a back stroke cylinder group that includes the cylinders in which the fuel in the amount corresponding to the start-up injection amount command value cannot be injected by the early stage of the first valve opening period of the intake valve after the crank angle is determined,
wherein the control section newly sets a fuel injection mode for high alcohol concentration as a fuel injection mode in which an amount of the fuel present in the combustion chamber when the fuel in the combustion chamber is to be combusted in each cylinder after the crank angle is determined in a state where the alcohol concentration in the fuel is high is brought to a value required to start the engine,
wherein the fuel injection mode for high alcohol concentration is improved grouped injection in which, after the crank angle is determined, in the cylinders of the front stroke cylinder group, fuel injection is started so that the injection of the fuel in the amount corresponding to the start-up injection amount command value is completed by the early stage of the valve opening period of the intake valve, and in the cylinders of the back stroke cylinder group, injection of the fuel in an amount corresponding to a start-up injection amount command value, which is corrected to a value larger than the start-up injection amount command value that is used for the fuel injection in the cylinders of the front stroke cylinder group, is started at the same timing as the fuel injection in the cylinder of the front stroke cylinder group, in which a piston is in the same position as that in the cylinder of the back stroke cylinder group, and
wherein when the alcohol concentration in the fuel is high, the control section shifts the fuel injection mode after the crank angle is determined to the fuel injection mode for high alcohol concentration, and the control section controls fuel injection from the fuel injection valve for each cylinder after the crank angle is determined in order to achieve the fuel injection mode for high alcohol concentration.

2. The fuel injection control apparatus for an internal combustion engine according to claim 1, wherein the control section realizes a correction to increase the start-up injection amount command value for the cylinders of the back stroke cylinder group, which is executed for the improved grouped injection, by making a correction corresponding to an increase correction value to the calculated start-up injection amount command value, and the control section gradually increases the increase correction value as the alcohol concentration in the fuel becomes a higher value.

3. The fuel injection control apparatus for an internal combustion engine according to claim 1, wherein:
the control section sets each sequential injection and normal grouped injection as a fuel injection mode, in which an amount of the fuel, that is present in the combustion chamber when the fuel in the combustion chamber is to be combusted in each cylinder for a first time after the crank angle is determined in a state where the alcohol concentration in the fuel is low, is brought to a value required to start the engine;
the control section sets the sequential injection such that injection of the fuel in the amount corresponding to the start-up injection amount command value is started in each cylinder at a timing set with reduction in exhaust emissions of the internal combustion engine taken into account;
the control section sets the normal grouped injection such that, in the cylinders of the front stroke cylinder group, fuel injection is started so that the injection of the fuel in the amount corresponding to the start-up injection amount command value is completed by the early stage of the valve opening period of the intake valve and, in the cylinders of the back stroke cylinder group, injection of the fuel in the amount corresponding to the start-up injection amount command value is started at the same timing as the fuel injection in the cylinder of the front stroke cylinder group in which the piston is in the same position as that in the cylinder of the back stroke cylinder group; and the control section determines the fuel injection mode after the crank angle in the state where the alcohol concentration in the fuel is low is shifted to the sequential injection when the engine temperature is low and is shifted to the normal grouped injection when the engine temperature is high, and the control section controls fuel injection from the fuel injection valve for each cylinder after the crank angle is determined in order to achieve the shifted fuel injection mode.

4. The fuel injection control apparatus for an internal combustion engine according; to claim 2, wherein:

the control section sets each sequential injection and normal grouped injection as a fuel injection mode, in which an amount of the fuel, that is present in the combustion chamber when the fuel in the combustion chamber is to be combusted in each cylinder for a first time after the crank angle is determined in a state where the alcohol concentration in the fuel is low, is brought to a value required to start the engine;

the control section sets the sequential injection such that injection of the fuel in the amount corresponding to the start-up injection amount command value is started in each cylinder at a timing set with reduction in exhaust emissions of the internal combustion engine taken into account;

the control section sets the normal grouped injection such that, in the cylinders of the front stroke cylinder group, fuel injection is started so that the injection of the fuel in the amount corresponding to the start-up injection amount command value is completed by the early stage of the valve opening period of the intake valve and, in the cylinders of the back stroke cylinder group, injection of the fuel in the amount corresponding to the start-up injection amount command value is started at the same timing as the fuel injection in the cylinder of the front stroke cylinder group in which the piston is in the same position as that in the cylinder of the back stroke cylinder group; and the control section determines the fuel injection mode after the crank angle in the state where the alcohol concentration in the fuel is low is shifted to the sequential injection when the engine temperature is low and is shifted to the normal grouped injection when the engine temperature is high, and the control section controls fuel injection from the fuel injection valve for each cylinder after the crank angle is determined in order to achieve the shifted fuel injection mode.

5. The fuel injection control apparatus for an internal combustion engine according to claim 1, wherein:

the control section sets intake synchronous injection in which fuel injection is started in each cylinder so that the injection of the fuel in an amount corresponding to the start-up injection amount command value is completed in each cylinder in the early stage of the valve opening period of the intake valve as a fuel injection mode, in which an amount of the fuel present in the combustion chamber when the fuel in the combustion chamber is to be combusted in each cylinder after the crank angle is determined in a state where the engine temperature is extremely low is brought to a value required to start the engine; and if the engine temperature when the engine is started is extremely low, the control section shifts the fuel injection mode after the crank angle is determined to the intake synchronous injection regardless of the alcohol concentration in fuel, and the fuel is injected from the fuel injection valve for each cylinder after the crank angle is determined in order to execute the intake synchronous injection.

6. The fuel injection control apparatus for an internal combustion engine according to claim 2, wherein:

the control section sets intake synchronous injection in which fuel injection is started in each cylinder so that the injection of the fuel in an amount corresponding to the start-up injection amount command value is completed in each cylinder in the early stage of the valve opening period of the intake valve as a fuel injection mode, in which an amount of the fuel present in the combustion chamber when the fuel in the combustion chamber is to be combusted in each cylinder after the crank angle is determined in a state where the engine temperature is extremely low is brought to a value required to start the engine; and if the engine temperature when the engine is started is extremely low, the control section shifts the fuel injection mode after the crank angle is determined to the intake synchronous injection regardless of the alcohol concentration in fuel, and the fuel is injected from the fuel injection valve for each cylinder after the crank angle is determined in order to execute the intake synchronous injection.

7. The fuel injection control apparatus for an internal combustion engine according to claim 3, wherein:

the control section sets intake synchronous injection in which fuel injection is started in each cylinder so that the injection of the fuel in an amount corresponding to the start-up injection amount command value is completed in each cylinder in the early stage of the valve opening period of the intake valve as a fuel injection mode, in which an amount of the fuel present in the combustion chamber when the fuel in the combustion chamber is to be combusted in each cylinder after the crank angle is determined in a state where the engine temperature is extremely low is brought to a value required to start the engine; and if the engine temperature when the engine is started is extremely low, the control section shifts the fuel injection mode after the crank angle is determined to the intake synchronous injection regardless of the alcohol concentration in fuel, and the fuel is injected from the fuel injection valve for each cylinder after the crank angle is determined in order to execute the intake synchronous injection.

8. The fuel injection control apparatus for an internal combustion engine according to claim 4, wherein:

the control section sets intake synchronous injection in which fuel injection is started in each cylinder so that the injection of the fuel in an amount corresponding to the start-up injection amount command value is completed in each cylinder in the early stage of the valve opening period of the intake valve as a fuel injection mode, in which an amount of the fuel present in the combustion chamber when the fuel in the combustion chamber is to be combusted in each cylinder after the crank angle is determined in a state where the engine temperature is extremely low brought to a value required to start the engine; and if the engine temperature when the engine is started is extremely low, the control section shifts the fuel injection mode after the crank angle is determined to the intake synchronous injection regardless of the alcohol concentration in fuel, and the fuel is injected from the fuel injection valve for each cylinder after the crank angle is determined in order to execute the intake synchronous injection.

* * * * *